(12) United States Patent
Eidus et al.

(10) Patent No.: US 8,190,827 B2
(45) Date of Patent: May 29, 2012

(54) MEMORY SHARING AMONG COMPUTER PROGRAMS

(75) Inventors: Izik Eidus, Kfar Saba (IL); Andrea Arcangeli, Bologna (IT); Christopher M. Wright, Portland, OR (US)

(73) Assignee: Red Hat, Inc., Raleigh, NC (US)

( * ) Notice: Subject to any disclaimer, the term of this patent is extended or adjusted under 35 U.S.C. 154(b) by 577 days.

(21) Appl. No.: 12/395,467

(22) Filed: Feb. 27, 2009

(65) Prior Publication Data

US 2010/0223432 A1 Sep. 2, 2010

(51) Int. Cl.
*G06F 12/00* (2006.01)
(52) U.S. Cl. .................. 711/148; 711/147; 711/E12.001
(58) Field of Classification Search .......... 711/147–148, 711/E12.001
See application file for complete search history.

(56) References Cited

U.S. PATENT DOCUMENTS 6,789,156 B1 * 9/2004 Waldspurger ..................... 711/6

* cited by examiner

*Primary Examiner* — Jasmine Song
(74) *Attorney, Agent, or Firm* — Lowenstein Sandler PC

(57) ABSTRACT

A physical memory location among multiple programs is shared among multiple programs. In one embodiment, multiple memory units are scanned to detect duplicated contents in the memory units. The memory units are used by programs running on a computer system. A data structure is used to identify memory units of identical contents. To improve performance, an additional data structure can be used to identify memory units of identical contents. Memory units that are identified to have identical contents can share the same physical memory space.

29 Claims, 6 Drawing Sheets

MEMORY SHARING AMONG COMPUTER PROGRAMS

TECHNICAL FIELD

Embodiments of the present invention relate to memory management, and more specifically, to sharing memory units that have the same contents among computer programs.

BACKGROUND

Modern computer systems use various memory management techniques to improve memory utilization. For example, a modern computer usually contains hardware and software components for mapping the working address space (also referred to as virtual memory space) of application programs into physical memory space. An application program can be provided with contiguous virtual memory space, which may be physically fragmented and may even overflow on to disk storage. The virtual memory space of an application program is divided into pages, with each page being a block of contiguous virtual memory addresses. A page table can be used to translate the virtual addresses of an application program into physical addresses used by the hardware to process instructions.

Efficient memory management is critical to the performance of a virtual machine system. A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor virtualizes the underlying hardware of the host computer, making the use of the virtual machine transparent to the guest operating system and the user of the computer.

On a computer system that stores a large number of files and executes a large number of application programs, it is likely that some of the files and programs contain duplicated contents. A host computer that supports multiple virtual machines can also have duplicated contents in its virtual machines, guest operating systems, and/or application programs. Storing duplicated contents in memory leads to poor utilization of memory resources and degradation of system performance. For example, thrashing may occur when there is insufficient physical memory to hold a working set of running programs. Thus, there is a need to develop a technique for detecting and managing programs that have duplicated contents.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
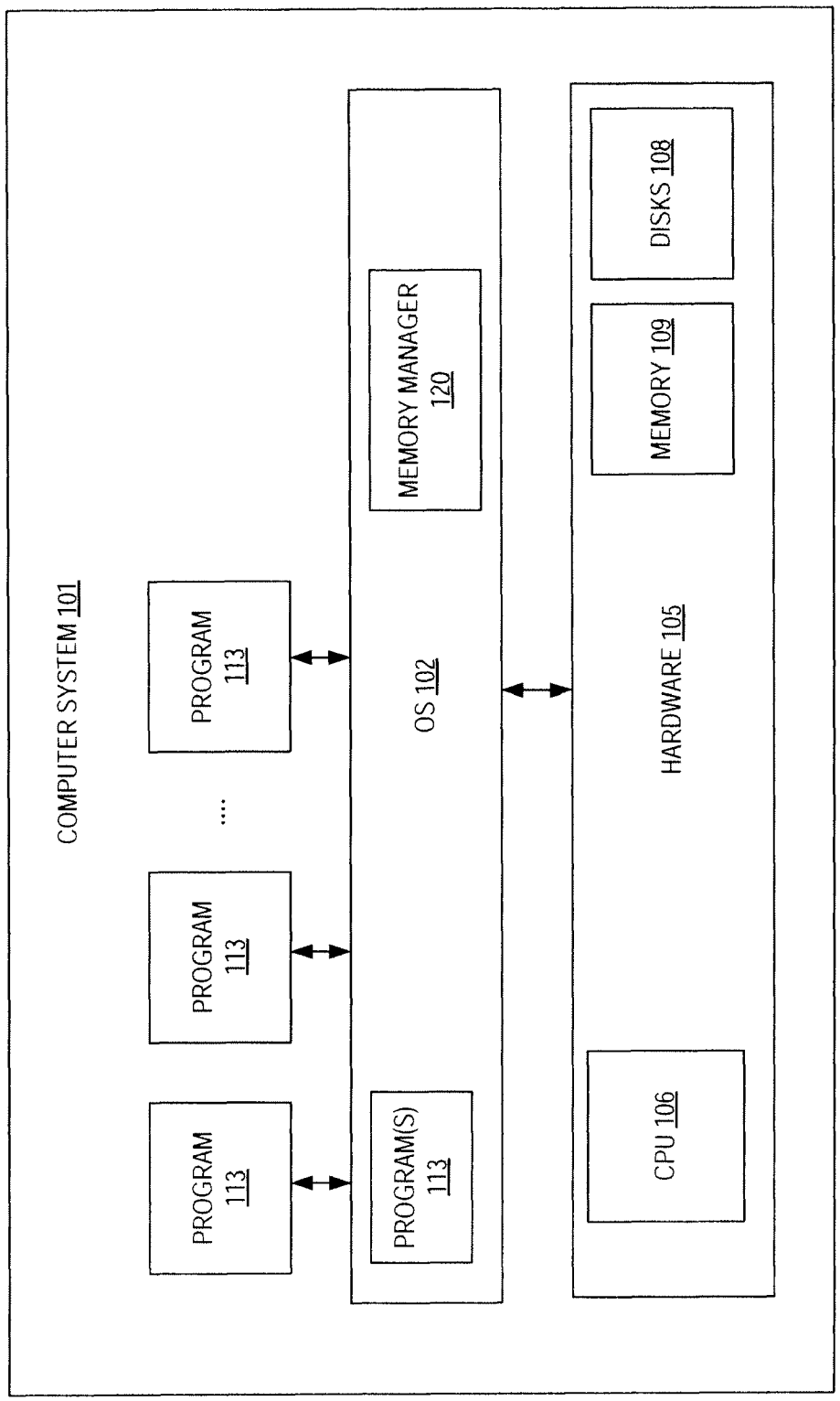
FIG. 1 is a block diagram illustrating one embodiment of a computer system that runs multiple application programs.

Described herein is a method and system for sharing a physical memory location among multiple programs. In one embodiment, a list of memory units is scanned to detect duplicated contents in the memory units. The memory units are used by programs running on a computer system. A data structure is used to identify memory units of identical contents. A candidate memory unit that matches a memory unit in the data structure is identified as a duplicated memory unit. To improve performance, an additional data structure can be used. A candidate memory unit that matches a memory unit in the additional data structure is identified as a duplicated memory unit. Memory units having identical contents can share the same physical memory space.

In the description herein, the term "memory unit" refers to an addressable block of memory used by the programs. For example, a memory unit can be a page. The memory sharing technique to be described below for memory units can also be applied to storage, such as disk storage or other forms of secondary storage. For simplicity of the discussion, the term "page" is used throughout the description. However, it is understood that the memory sharing technique can be applied to any memory unit and storage unit.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "scanning", "sorting", "causing", "using", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram that illustrates an embodiment of a computer system 101 that stores and executes a plurality of programs 113. The computer system 101 includes a central processing unit (CPU) 106, memory 109, disks 108 and other hardware components on an underlying hardware platform 105. Memory 109 may include volatile memory devices (e.g., random access memory (RAM)), non-volatile memory devices (e.g., flash memory), and/or other types of memory devices. The computer system 101 runs an operating system (OS) 102 to manage system resources, including access to the memory 109 and disks 108.

The OS 102 includes a memory manager 120 to manage memory sharing among the programs 113 and within each program 113. The programs 113 may include system programs, user programs, application programs and any programs, processes, or data files that can be part of the OS 102 or outside of the OS 102. The addressable working space (also referred to as "virtual memory space") of each program 113 is divided into a plurality of memory units; e.g., a 4K-byte block. These memory units are referred to as "pages" or "virtual pages." The memory manager 120 performs operations to identify virtual pages that have identical contents, and maps these pages into the same physical memory location. Thus, the physical memory space occupied by duplicated contents can be released and reused for other programs. The operations of the memory manager 120 will be described in greater detail with references to FIGS. 3-5.

Figure 2:
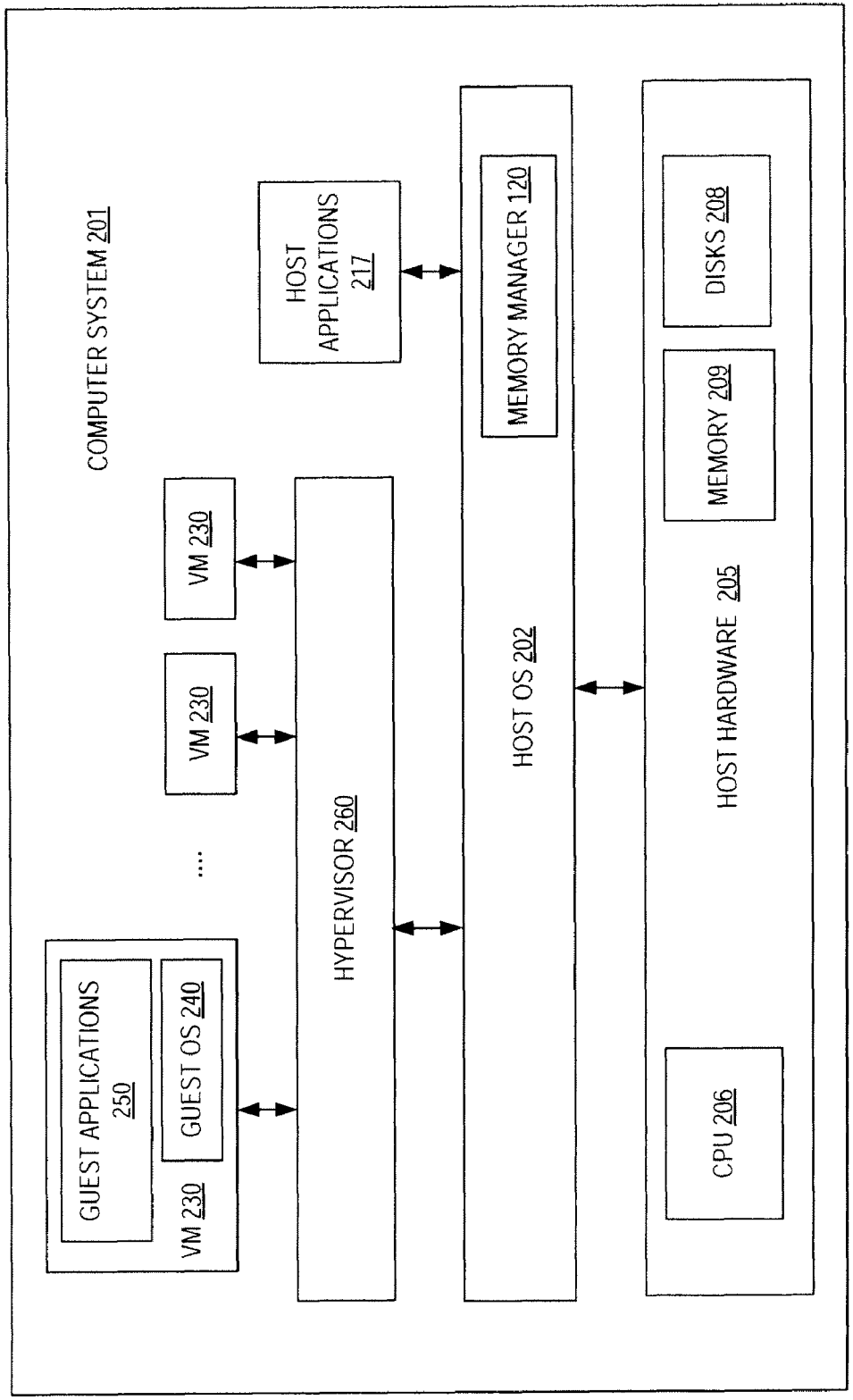
FIG. 2 is a block diagram illustrating one embodiment of a computer system that hosts multiple virtual machines.

FIG. 2 is a block diagram that illustrates another embodiment of a computer system 201 in which the memory manager 120 can be used. The computer system 201 hosts a plurality of virtual machines (VM) 230. Each virtual machine 230 runs a guest OS 240 and one or more guest applications 250. The guest OS 240 on each virtual machine 230 may be the same or different. The computer system 201 includes a hypervisor 260 that virtualizes an underlying host hardware platform 205 for the virtual machines 230. Hypervisor 260 is also known as a virtual machine monitor (VMM) or a kernel-based hypervisor. In some embodiments, hypervisor 260 is part of a host OS 202. In some scenarios, the host hardware 205 can properly operate in an additional mode to support the virtual machines 230, and the hypervisor 260 is just managing that additional mode. The host hardware 205 includes a CPU 206, memory 209, disks 208 and other hardware components. Memory 209 may include volatile memory devices (e.g., random access memory (RAM)), non-volatile memory devices (e.g., flash memory), and/or other types of memory devices.

The host OS 202 includes the memory manager 120 that manages memory sharing among the programs and with each program that runs on the computer system 201. The programs may include the virtual machines 230, the guest OS 240, guest applications 250, host applications 217, system programs, user programs, application programs and any programs, processes, or data files that are on the host 201. Memory sharing can improve memory utilization and can increase the number of virtual machines 230 hosted by the computer system 201. In accordance with an embodiment of the present invention, the memory manager 120 detects duplicated pages in the programs, collapses the duplicated pages into a single merged page, maps the merged page into a shared physical memory location, and marks the contents in the shared location as write protected. When any of the programs requests to write into its page contents, the memory manager 120 copies the contents in the shared location to another location, and re-directs the write request to the copied location.

Figure 3:
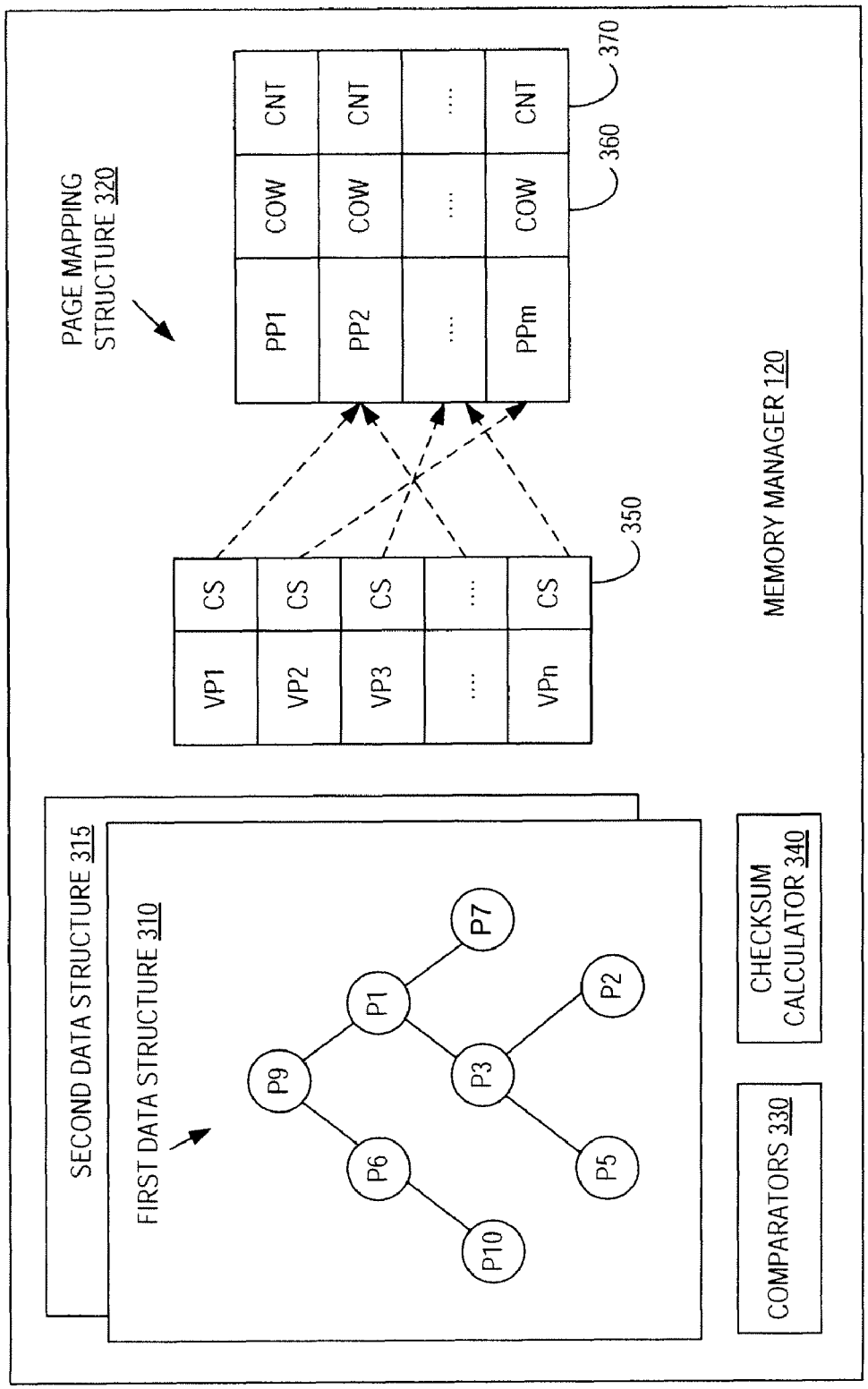
FIG. 3 is a block diagram illustrating one embodiment of a memory manager in the computer systems of FIG. 1 and FIG. 2.

FIG. 3 illustrates an embodiment of the components of the memory manager 120. The memory manager 120 maintains one or more data structures (e.g., a first data structure 310 and a second data structure 315) for sorting pages by their contents. The memory manager 120 can search the sorted data structures to determine whether a given page ("a candidate page") has the same contents as another page that has already been inserted (and has already been sorted) into the data structures. The memory manager 120 scans all the pages in memory 209 of the computer system 101 or 201 in a loop. In one embodiment, each program of the computer system 101 or 201 may register a portion of or an entire content of the program with the memory manager 120 so that only the pages corresponding to the registered portions are being scanned in a loop by the memory manager.

In one embodiment, the memory manager 120 uses only the first data structure 310 to identify pages of identical contents. Each entry in the first data structure 310 is a reference (e.g., a pointer) to a page. The memory manager 120 sorts the pages by contents. The first data structure 310 can be a tree. In one embodiment, the first data structure 310 is a red-black tree (rbtree), which is a self-balancing binary search tree that can be used to improve search performance. When two pages having the same contents are found, the two duplicated pages are merged and mapped into the same physical location. The shared physical location is write-protected to prevent its contents from being modified. A write operation attempting to modify the contents of the physical location will trigger a copy-on-write operation that copies the shared contents to another location that is set as not write-protected. In one embodiment, the first data structure 310 contains references to only the pages that have unchanged contents for a period of time. That is, only the pages that have "stable" contents will be placed into the first data structure 310. A checksum, a hash value, or a dirty bit can be used to indicate whether the page contents have changed since the last scan. The first data structure 310 can be re-initialized each time after all of the pages are scanned to purge stale information. In the following description, it is understood that a page that is "pointed to" by a data structure is the same as a page that is "in" the data structure.

In the embodiment shown in FIG. 3, the first data structure 310 is a tree, e.g., a rbtree tree, a balanced tree, a binary tree, or any search tree. Each node of the tree 310 points to the contents of a page (indicated by P1, P2, P3, etc.). The tree can be sorted using a regular memory compare function (e.g., memcmp) that compares the contents of the candidate page with the contents of the page referenced to by each tree node (that is, a page referenced by a node that has already been inserted into the sorted tree). The nodes of the tree may be linked to the contents of the pages by pointers. A candidate page can be compared against a page already inserted in the sorted tree, by traversing the tree from the root to the leaves in a sort order. For example, by checking the return value of the memory compare function, if the contents of the candidate page are greater than the page contents referenced by the node being traversed, the traversing process will proceed to the right of the tree. If the contents of the candidate page is not greater, then the traversing process will proceed to the left. A match is found if a node is reached where the contents of the page referenced by the node equals the contents of the candidate page according to the memory compare operation.

To optimize the performance of the process of memory sharing, two data structures 310 and 315 can be used. The first data structure 310 points to pages that have been identified as having identical contents. The second data structure 315 is used as a filter for identifying the pages that can be placed into the first data structure 310. The second data structure 315 can be used to identify the pages that have identical contents. In one embodiment, a candidate page that is identified as having the same contents as a page ("matching page") in the second data structure can be merged with the matching page. The merged page can then be inserted to first data structure. In one embodiment, the second data structure 315 contains references to only the pages that have unchanged contents for a period of time. A checksum, a hash value, or a dirty bit can be used to indicate whether the page contents have changed since the last scan. The second data structure 315 can be re-initialized each time after all of the pages are scanned to purge stale information.

In one embodiment, both of the data structures 310 and 315 can be trees (e.g., rbtrees) and can be searched by the same traversing process as described above. The first data structure 310 is referred to as a "stable" tree, the pages in which are write-protected. A page is inserted into the stable tree 310 if it has been detected as having two or more duplicated copies. The second data structure 315 is referred to as an "unstable" tree. The contents of the unstable tree 315 are not write-protected. The unstable tree 315 is destroyed at the end of a scanning process that runs in the background, and is re-built during each loop instance of the scanning process. The unstable tree 315 keeps track of the pages whose contents have been stabilized, or unchanged, for a period of time. As the pages in the unstable tree 315 have not been recently modified, these pages are likely good candidates for insertion into the stable tree 310. In one embodiment, the memory manager 120 uses a checksum 350 of a page as an indicator of whether the page contents have been modified. The memory manager 120 stores the checksum 350 of a page and re-computes the checksum at each loop instance of the scanning process. The memory manager page determines the page as recently modified if its re-computed checksum 350 is different from the stored value. In an alternative embodiment, a dirty bit can be checked to see if the page has been written to. In yet another alternative embodiment, a hash value may be used in place of the checksum 350.

In one embodiment, the memory manager 120 also maintains a page mapping module 320 to keep track of the mapping between virtual pages (shown in FIG. 3 as "VPs") to physical memory locations (also referred to as physical pages or "PPs") in physical memory (e.g., the memory 109 or 209 of FIGS. 1 and 2). One or more virtual pages may be mapped to the same physical page. For each virtual page, the memory manager 120 stores its checksum 350 (if any has been computed) and a reference (e.g., a pointer) to a physical page. If the physical page is shared by more than two virtual pages, a copy-on-write (COW) flag 360 of the physical page is set to indicate that the contents of the page is write-protected. The memory manager 120 can also include a counter 370 to count the number of virtual pages that share the physical page.

When the memory manager 120 merges two virtual pages of identical contents, it updates the page mapping module 320 accordingly. The memory manager 120 first updates the pointer of a duplicated virtual page to point to a shared physical page. The memory manager 120 further sets the COW flag 360 of the shared physical page and increments the counter 370 of the shared physical page by one. When a physical page is no longer used by any program (e.g., when all of the virtual pages that share the physical location are modified), the memory manager 120 resets the COW flag 360 associated with the physical page, and removes the corresponding node in the first data structure 310. The removal of the nodes in the first data structure 310 can be synchronous with a page fault that handles a write to the page, or can be an asynchronous process that traverses and rebalances the tree in the background.

In one embodiment, the memory manager 120 includes comparators 330 for performing the compare functions at each node of the trees 310, 315, and checksum calculators 340 to compute the checksums of the pages. The memory manager 120 also includes memory circuitry, such as registers, RAM, etc., to store the checksums 350, the COW flags 360 and the counters 370.

In one embodiment, the two data structures 310 and 315 can be implemented on a multiprocessor architecture that has a non-uniform memory access (NUMA) property. For example, the computer systems 101, 201 of FIGS. 1 and 2 may each include a plurality of CPUs 106, 206. The memory 109, 209 may each include a plurality of memory modules ("NUMA nodes"). In a NUMA architecture, the latency of a memory access can differ when a different NUMA node is accessed. For example, a group or cluster of processors may be physically closer to particular NUMA node, so that the latency of accessing a "local" NUMA node is much lower than that of a "remote" NUMA node. In a NUMA architecture, pages will only be merged when they are on the same NUMA node and have identical contents. In one scenario, each NUMA node maintains the data structure 310 (when only one data structure is used) or both data structures 310 and 315 locally. In this scenario, the list of pages to be scanned can be split among the NUMA node such that each NUMA node gets a portion of the list to be stored locally. Thus, the pages on each NUMA node can be scanned to identify pages of the same contents. Alternatively, the first data structure 310 (when only one data structure is used), or both data structures 310 and 315, can be maintained globally by a computer system (e.g., the computer system 101 or 201). In this alternative scenario, the list of pages to be scanned is not split among the NUMA nodes. Thus, pages having identical contents may not reside on the same NUMA node. In this alternative scenario, pages will only be merged when they are on the same NUMA node and have identical complete page contents.

Figure 4:
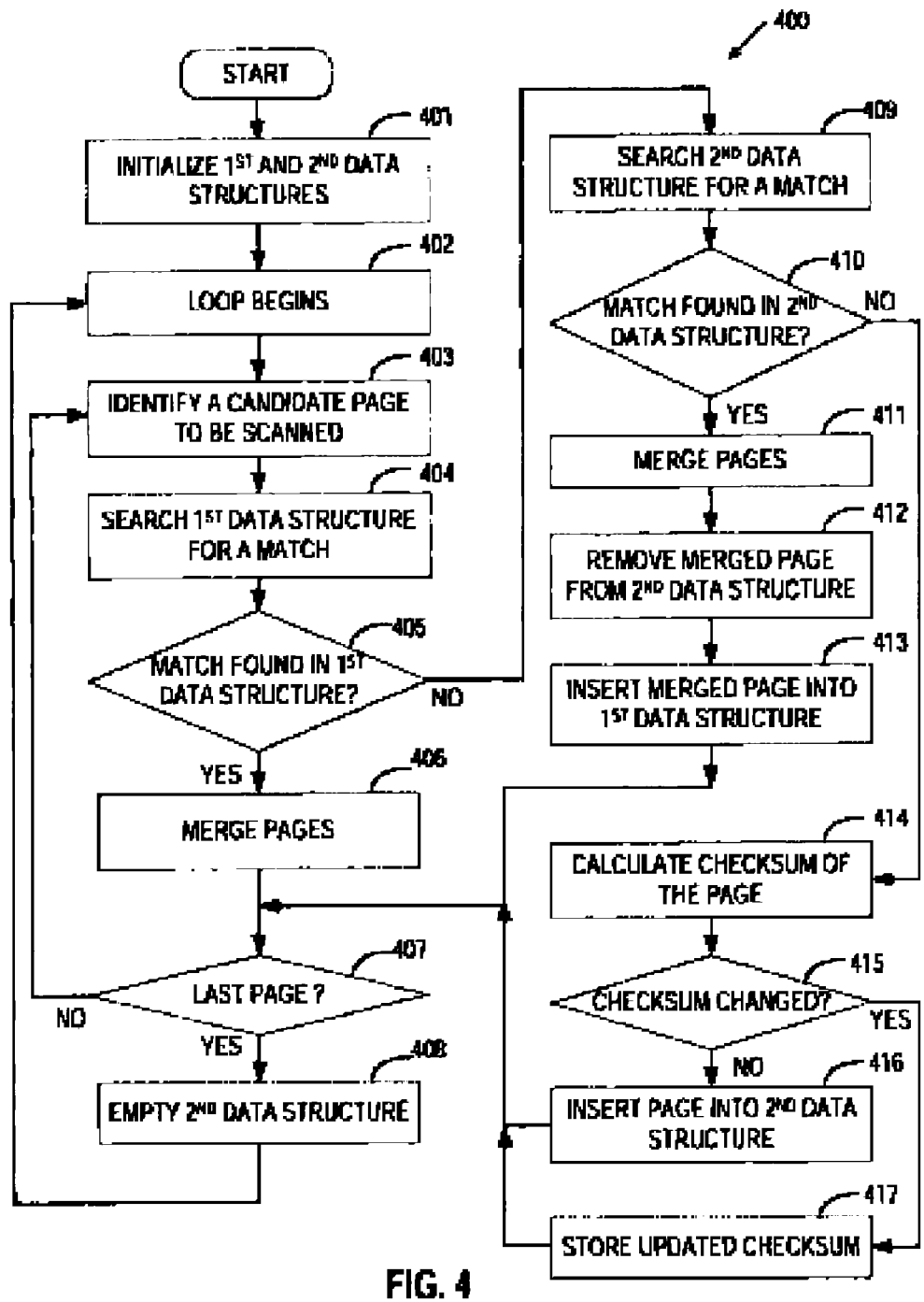
FIG. 4 is a flow diagram illustrating a method for merging pages of identical contents, in accordance with one embodiment of the present invention.

FIG. 4 is a flow diagram illustrating one embodiment of a method 400 for identifying pages of identical contents. The method 400 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the memory manager 120 (FIGS. 1 and 2). The memory manager 120 can run a scanning process in an infinite loop in the background until it is terminated by a user (e.g. a system administrator). During each loop instance, the memory manager 120 scans a list of virtual pages whose contents can be merged and mapped into a shared physical memory location. In one embodiment, the list of virtual pages may be registered with the memory manager 120.

Referring to FIG. 4, in one embodiment, the method 400 begins with the memory manager 120 initializing the first and the second data structures 310 and 315 at block 401. At block 402, the memory manager 120 begins an infinite loop for scanning the virtual pages. At block 403, the memory manager 120 identifies a candidate page to be scanned (e.g., the next page on the list of registered pages). At block 404, the memory manager 120 searches the first data structure 310 to determine, at block 405, whether the candidate page matches a page in the first data structure 310. If a match is found in the first data structure 310, the memory manager 120 merges the candidate page with the page in the first data structure at block 406, and the method proceeds to block 407. If a match cannot be found at block 405, then the method 400 proceeds to block 409 to search the second data structure 315.

Proceeding to block 410, if a match is found in the second data structure 315, the memory manager 120 merges the candidate page with the page in the second data structure 315 at block 411. The merged page is removed from the second data structure 315 at block 412, and then inserted into the first data structure 310 at block 413. The method 400 then proceeds to block 407. If a match cannot be found at block 410, the memory manager 120 calculates the checksum of the candidate page at block 414. At block 415, the memory manager 120 determines whether the checksum has changed from a stored checksum of the candidate page, if any has been computed in the previous loop instances. If there is no change, at block 416, the candidate page is inserted into the second data structure 315. If the checksum has changed, the updated checksum is stored at block 417, and the candidate page is left in the list without getting inserted into either data structure. The method 400 then proceeds to block 407.

At block 407, it is determined whether the current candidate page is the last page in the list to be scanned. If it is not the last page, then the loop continues to block 403 to identify the next page to be scanned. If the current page is the last page, then the second data structure 315 is re-initialized (e.g., emptied) at block 408 and the method proceeds to block 402 to re-start a new instance of the loop.

Figure 5:
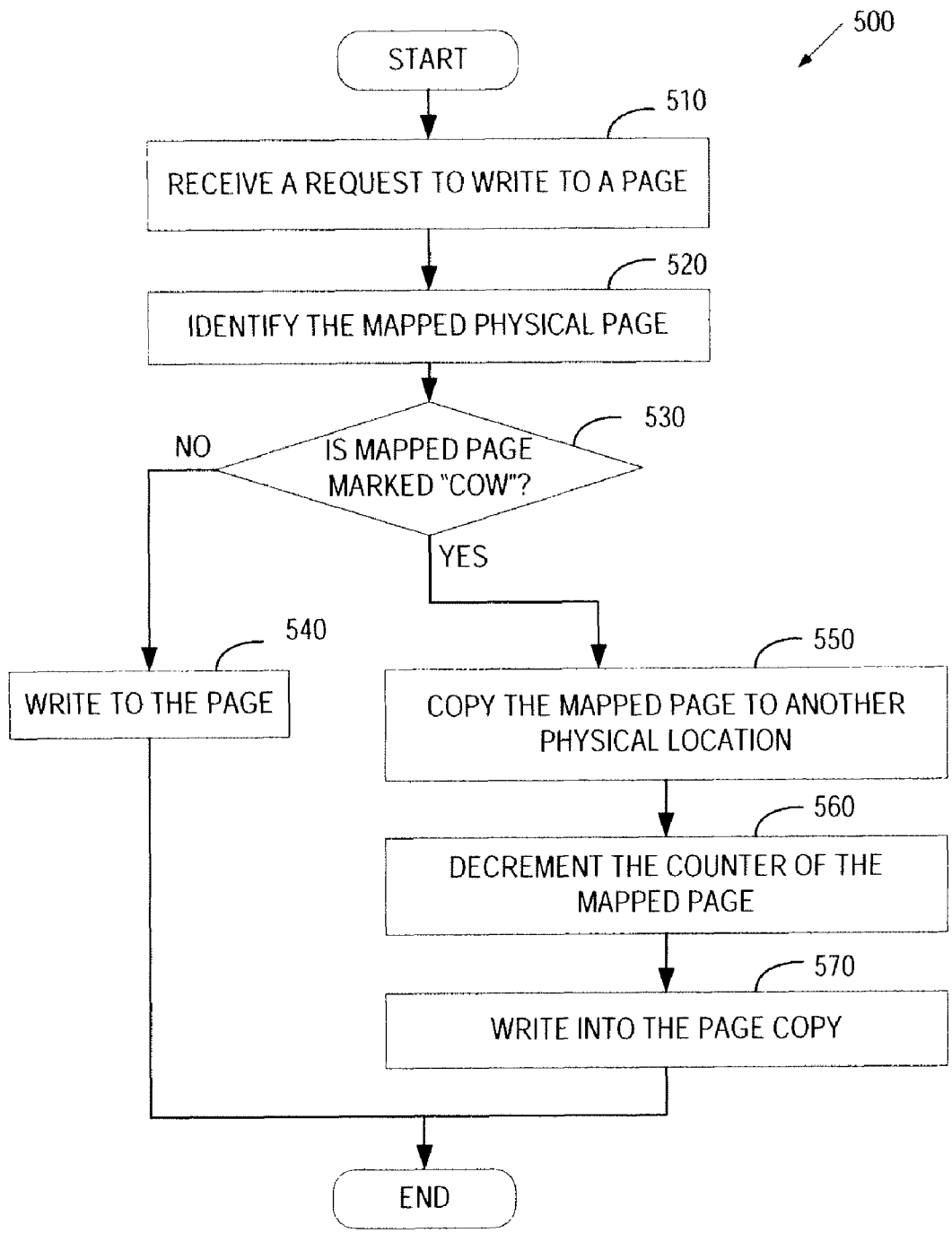
FIG. 5 is a flow diagram illustrating a method for performing copy-on-write on a merged page, in accordance with one embodiment of the present invention

FIG. 5 is a flow diagram illustrating one embodiment of a method 500 for performing copy-on-write on a merged page. The method 500 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the memory manager 120 (FIGS. 1 and 2). In some computer systems, the method 500 can be performed by the memory manager 120 in cooperation with other software or hardware components, such as a memory management unit (MMU) and translation look-aside buffers (TLB) to improve the speed of virtual address translation.

Referring to FIG. 5, at block 510, the memory manager 120 receives a request from a program (e.g., the program 113 of FIG. 1 or the virtual machine 230 of FIG. 2) to write to a virtual page. At block 520, the memory manager 120 identifies the physical page to which the virtual page is mapped. At block 530, the memory manager 120 determines whether the mapped physical page has been marked as copy-on-write ("COW"). If the physical page has not been marked as copy-on-write (which means the page is not a shared page), at block 540, the write operation is allowed to proceed. If the physical page has been marked as copy-on-write (which means the page is shared), a page fault is generated to handle the write operation. A page fault handler copies the contents of the shared page to another physical location at block 550, and the counter (e.g., counter 370 of FIG. 3) associated with the shared page is decremented by one at block 560. At block 570, the write operation is performed on the copied physical location. Then the method 500 terminates.

Figure 6:
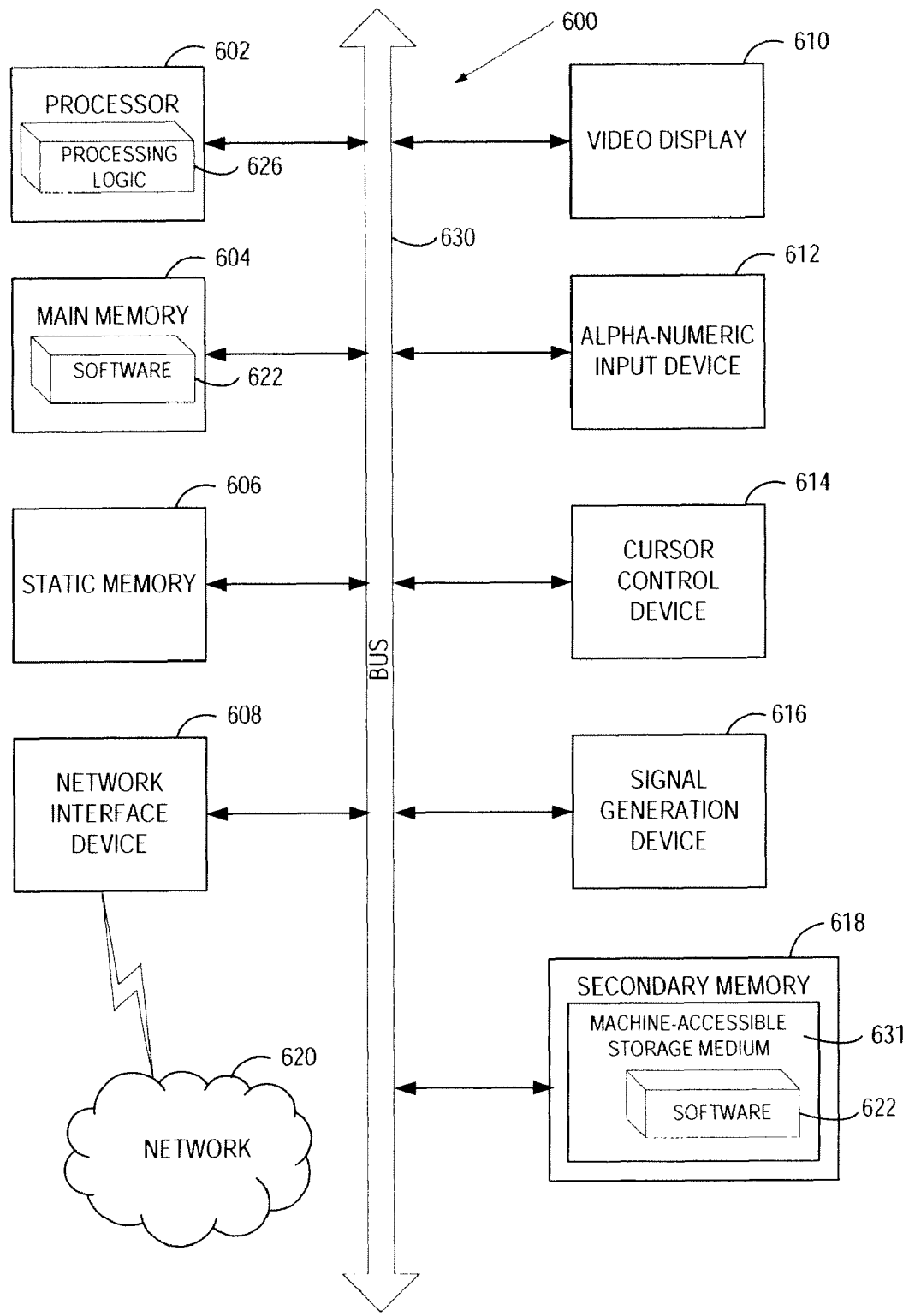
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store memory manager 120 (FIGS. 1 and 2) and/or the pages to be scanned. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
scanning, by a computer system, each of a plurality of memory units;
sorting, by the computer system, the memory units by contents of the memory units, the sorting using a data structure that contains references to the memory units in order to identify the memory units having identical contents; and
causing, by the computer system, a same physical memory space to be shared among the memory units that are identified to have identical contents;
wherein the data structure holds internal information inside each tree node to guarantee O(log(N)) lookup, insertion, and deletion computational complexity, the computational complexity staying the same when the contents of the memory units are changing and the data structure is not being updated accordingly.

2. The method of claim 1, wherein all of the memory units pointed to by the data structure are protected against write operations.

3. The method of claim 1, wherein the data structure is a tree.

4. The method of claim 1, wherein the data structure contains references to only the memory units that have unchanged contents for a period of time.

5. The method of claim 4, further comprising:
using a checksum, a hash value, or a dirty bit to determine whether a candidate memory unit has unchanged contents for the period of time.

6. The method of claim 1, further comprising:
re-initializing the data structure each time after all of the memory units are scanned.

7. The method of claim 1, wherein the data structure is a red-black tree (rbtree).

8. The method of claim 1, further comprising:
sorting, by the computer system, the memory units by contents using an additional data structure that contains references to the memory units;
identifying the memory units having identical contents using the additional data structure; and
placing the memory units identified with the additional data structure into the data structure.

9. The method of claim 8, wherein the additional data structure is a tree.

10. The method of claim 8, wherein the additional data structure contains references to only the memory units that have unchanged contents for a period of time.

11. The method of claim 10, further comprising:
using a checksum, a hash value, or a dirty bit to determine whether a candidate memory unit has unchanged contents for the period of time.

12. The method of claim 8, further comprising:
re-initializing the additional data structure each time after all of the memory units are scanned.

13. The method of claim 8, wherein the additional data structure is a red-black tree (rbtree).

14. The method of claim 8, wherein the additional data structure holds internal information inside each tree node to guarantee O(log(N)) lookup, insertion and deletion computational complexity, the computational complexity staying the same when the contents of the memory units are changing and the additional data structure is not being updated accordingly.

15. The method of claim 1, further comprising:
sorting, by the computer system, the memory units by contents using an additional data structure that contains references to the memory units that are not write protected, while the data structure contains only references to memory units that are write protected;

identifying memory units having the same contents as the candidate memory unit by searching both the data structure and the additional data structure if no match is found in the data structure; and placing a merged memory unit into the data structure if a match is found in the additional data structure, the merged memory unit formed by merging the candidate memory unit and a matching memory unit found in the additional data structure.

16. The method of claim 1, wherein the memory units include disk storage units.

17. The method of claim 1, wherein causing the same physical memory space to be shared further comprises:

determining whether the memory units can share the same physical memory space by taking into consideration of the locality of the memory units with respect to NUMA nodes in the computer system.

18. A system comprising:

data storage to include a plurality of memory units;

a memory manager coupled to the data storage, the memory manager configured to:

scan each of the plurality of memory units; and sort the memory units by contents of the memory units, the sorting using a data structure to identify the memory units having identical contents, wherein the data structure contains references to the memory units; and a page mapping module communicably coupled to the memory manager, the page mapping module configured to map a same physical memory space to the memory units that are identified to have identical contents;

wherein the data structure holds internal information inside each tree node to guarantee O(log(N)) lookup, insertion, and deletion computational complexity, the computational complexity staying the same when the contents of the memory units are changing and the data structure is not being updated accordingly.

19. The system of claim 18, wherein all of the memory units pointed to by the data structure are protected against write operations.

20. The system of claim 18, wherein the data structure contains references to only the memory units that have unchanged contents for a period of time.

21. The system of claim 18, wherein the data structure is re-initialized each time after all of the memory units are scanned.

22. The system of claim 18, wherein the memory manager is to further sort the memory units by contents using an additional data structure that contains references to the memory units, to identify the memory units having identical contents using the additional data structure, and to place the memory units identified with the additional data structure into the data structure.

23. A non-transitory computer readable storage medium including instructions that, when executed by a processing system, cause the processing system to perform a method comprising:

scanning, by a computer system, each of a plurality of memory units;

sorting, by the computer system, the memory units by contents of the memory units, the sorting using a data structure that contains references to the memory units in order to identify the memory units having identical contents; and causing, by the computer system, a same physical memory space to be shared among the memory units that are identified to have identical contents;

wherein the data structure holds internal information inside each tree node to guarantee O(log(N)) lookup, insertion, and deletion computational complexity, the computational complexity staying the same when the contents of the memory units are changing and the data structure is not being updated accordingly.

24. The non-transitory computer readable storage medium of claim 23, wherein all of the memory units pointed to by the data structure are protected against write operations.

25. The non-transitory computer readable storage medium of claim 23, wherein the data structure contains references to only the memory units that have unchanged contents for a period of time.

26. The non-transitory computer readable storage medium of claim 23, wherein the method further comprises:

re-initializing the data structure each time after all of the memory units are scanned.

27. The non-transitory computer readable storage medium of claim 23, wherein the method further comprises:

sorting, by the computer system, the memory units by contents using an additional data structure that contains references to the memory units;

identifying the memory units having identical contents using the additional data structure; and placing the memory units identified with the additional data structure into the data structure.

28. A computer-implemented method comprising:

reading, by a computer system, each of a plurality of memory units;

sorting, by the computer system, the memory units by contents of the memory units, the sorting using a data structure that contains references to the memory units in order to identify the memory units having identical contents; and instructing, by the computer system, the memory units that are identified to have identical contents to share a same physical memory space;

wherein the data structure holds internal information inside each tree node to guarantee O(log(N)) lookup, insertion, and deletion computational complexity, the computational complexity staying the same when the contents of the memory units are changing and the data structure is not being updated accordingly.

29. The method of claim 28, further comprising:

sorting, by the computer system, the memory units by contents using an additional data structure that contains references to the memory units;

identifying the memory units having identical contents using the additional data structure; and placing the memory units identified with the additional data structure into the data structure.

* * * * *

UNITED STATES PATENT AND TRADEMARK OFFICE
CERTIFICATE OF CORRECTION

| | | |
|---|---|---|
| PATENT NO. | : 8,190,827 B2 | Page 1 of 1 |
| APPLICATION NO. | : 12/395467 | |
| DATED | : May 29, 2012 | |
| INVENTOR(S) | : Izik Eidus et al. | |

It is certified that error appears in the above-identified patent and that said Letters Patent is hereby corrected as shown below:

Claim 26, Col. 12, Line 23, "of claim 23, wherein the method further comprises:" should be --of claim 24, wherein the method further comprises:--

Signed and Sealed this
Eleventh Day of September, 2012

David J. Kappos
*Director of the United States Patent and Trademark Office*